(12) United States Patent
Pandey et al.

(10) Patent No.: US 8,983,461 B1
(45) Date of Patent: Mar. 17, 2015

(54) METHODS AND SYSTEMS FOR MANAGING BOOMER SECTORS

(71) Applicant: Sprint Spectrum L.P., Overland Park, KS (US)

(72) Inventors: Chandra Pandey, Temecula, CA (US); Sandeep Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 86 days.

(21) Appl. No.: 13/764,484

(22) Filed: Feb. 11, 2013

(51) Int. Cl.
*H04W 4/00* (2009.01)
*H04W 48/16* (2009.01)
*H04W 16/18* (2009.01)
*H04W 48/18* (2009.01)
*H04W 16/30* (2009.01)

(52) U.S. Cl.
CPC .............. *H04W 48/16* (2013.01); *H04W 16/18* (2013.01); *H04W 48/18* (2013.01); *H04W 16/30* (2013.01)
USPC .......... 455/434; 455/435.1; 455/442; 455/443

(58) Field of Classification Search
CPC ..... H04W 16/18; H04W 16/30; H04W 48/16; H04W 48/18; H04W 48/20; H04W 60/00; H04W 60/02; H04W 60/04
USPC ................................ 455/434, 435.1, 442, 443
See application file for complete search history.

(56) References Cited

U.S. PATENT DOCUMENTS

| 5,982,758 | A  | * | 11/1999 | Hamdy .......................... 370/331 |
| 8,195,204 | B1 | * | 6/2012  | Shetty et al. ................... 455/458 |
| 8,391,872 | B1 | * | 3/2013  | Shetty et al. ................... 455/443 |
| 2006/0128312 | A1 | * | 6/2006 | Declerck et al. ........... 455/67.11 |
| 2007/0015512 | A1 | * | 1/2007 | Hunzinger .................... 455/439 |
| 2010/0210246 | A1 | * | 8/2010 | Yang et al. .................. 455/412.1 |
| 2013/0217412 | A1 | * | 8/2013 | Segall et al. ................ 455/456.1 |

OTHER PUBLICATIONS

Bamisaye et al., "Capacity and Quality Optimization of CDMA Networks", Journal of Telecommunications and Information Technology, Apr. 2010, pp. 101-104.

* cited by examiner

*Primary Examiner* — Khai M Nguyen

(57) ABSTRACT

Range indicators for sectors in a wireless network may be determined by measuring, in a plurality of test locations, signal strengths of pilot signals transmitted by the sectors. Each sector's determined range indicator may be stored as a predefined range indicator for the sector in association with a list of predefined neighbors for the sector. When a candidate sector is added to a mobile station's active set, a neighbor list may be constructed for the mobile station, by taking into account the predefined range indicator for the candidate sector. If the predefined range indicator indicates that the candidate sector has a standard range, then the candidate sector's predefined neighbors may be added to the neighbor list. If the predefined range indicator indicates that the candidate sector has a non-standard range (e.g., indicating a "boomer"), then the candidate sector's predefined neighbors may be omitted from the neighbor list.

18 Claims, 5 Drawing Sheets

| Sector | Predefined Range Indicator | Predefined Neighbors |
|--------|----------------------------|----------------------|
| 30a | K_BOOM = 0 | 30b, 30c, 22a, 29b, 29c, 36b, 36c, 37a |
| 30b | K_BOOM = 0 | 30a, 30c, 23b, 31a, 31c, 37a, 37c, 36b |
| 30c | K_BOOM = 0 | 30a, 30b, 29c, 22a, 22b, 23a, 23b, 31c |
| • • • | • • • | • • • |
| 37c | K_BOOM = 0 | 37a, 37b, 36c, 30a, 30b, 31a, 31b, 38c |
| • • • | • • • | • • • |
| 46c | K_BOOM = 1 | 46a, 46b, 45c, 41a, 41b, 42a, 42b, 47c |

| Sector | Predefined Range Indicator | Predefined Neighbors |
|---|---|---|
| 30a | K_BOOM = 0 | 30b, 30c, 22a, 29b, 29c, 36b, 36c, 37a |
| 30b | K_BOOM = 0 | 30a, 30c, 23b, 31a, 31c, 37a, 37c, 36b |
| 30c | K_BOOM = 0 | 30a, 30b, 29c, 22a, 22b, 23a, 23b, 31c |
| ⋮ | ⋮ | ⋮ |
| 37c | K_BOOM = 0 | 37a, 37b, 36c, 30a, 30b, 31a, 31b, 38c |
| ⋮ | ⋮ | ⋮ |
| 46c | K_BOOM = 1 | 46a, 46b, 45c, 41a, 41b, 42a, 42b, 47c |

Figure 3

METHODS AND SYSTEMS FOR MANAGING BOOMER SECTORS

BACKGROUND

A wireless network may provide wireless coverage in a plurality of wireless coverage areas, such as cells and/or sectors. A mobile station may be served by the wireless network via a one or more of the wireless coverage areas. The one or more wireless coverage areas that are being used to serve the mobile station may be identified in an "active set" that is maintained for that mobile station. As the mobile station changes location, the wireless coverage areas in its active set may also change. Thus, wireless coverage areas may be added to or dropped from the mobile station's active set, for example, due to movement of the mobile station, changes in network load or radio frequency (RF) conditions, or other factors.

A mobile station may also receive a neighbor list from the wireless network. The neighbor list may identify one or more wireless coverage areas that are not in the mobile station's active set but may be neighbors to one or more of the wireless coverage areas in the active set. The mobile station may measure the signal strengths of pilot signals transmitted by the one or more wireless coverage areas in the neighbor list and report the measured signal strengths to the wireless network. When the mobile station reports a measured signal strength for a wireless coverage area in the neighbor list that is sufficiently high, then that wireless coverage area may be added to the mobile station's active set.

The wireless network may determine a neighbor list for a mobile station in various ways. In a conventional approach, each wireless coverage area may be associated with a respective list of predefined neighbors. The neighbor list for a mobile station may then be constructed as a composite of the respective lists of predefined neighbors for each of the wireless coverage areas in the mobile station's active set. Thus, when a wireless coverage area is added to a mobile station's active set, the predefined neighbors for that wireless coverage area may be added to the mobile station's neighbor list. Similarly, when a wireless coverage area is dropped from a mobile station's active set, a new neighbor list for the mobile station may be constructed based on the predefined neighbors of the one or more wireless coverage areas remaining in the mobile station's active set.

OVERVIEW

In a first aspect, example embodiments provide a method. The method involves receiving, from a mobile station, a report of a measured signal strength of a pilot signal transmitted by a candidate sector, wherein the mobile station has an active set of at least one sector. The method further involves instructing the mobile station to add the candidate sector to the active set. In addition, the method involves retrieving, from data storage, data relating to the candidate sector. The data relating to the candidate sector includes a list of predefined neighbors for the candidate sector and a predefined range indicator for the candidate sector. Still further, the method involves constructing a neighbor list for the mobile station, which, in turn, involves determining whether to include in the neighbor list the predefined neighbors for the candidate sector based on the predefined range indicator for the candidate sector. The method also involves transmitting the neighbor list to the mobile station.

In a second aspect, example embodiments provide a system that includes data storage and a controller for controlling wireless service provided to a mobile station having an active set of sectors. The data storage stores sector data for a plurality of sectors in a wireless network. The sector data includes for each given sector in the plurality of sectors a respective list of predefined neighbors for the sector and a predefined range indicator for the given sector. The controller is configured to retrieve from the data storage the sector data for each sector in the mobile station's active set and construct a neighbor list for the mobile station based on the predefined neighbors and predefined range indicators in the retrieved sector data.

In a third aspect, example embodiments provide a method for a wireless network. The wireless network provides wireless coverage in a plurality of cells, and each cell in the plurality of cells includes a respective plurality of sectors. The method involves obtaining a range indicator for a target sector in the wireless network and storing the range indicator for the target sector in data storage that is accessible by a controller configured to construct neighbor lists for mobile stations being served by the wireless network. Obtaining the range indicator for the target sector may, in turn, involve: (a) measuring, in a plurality of test locations, signal strengths of a pilot signal transmitted by the target sector, so as to obtain a plurality of measured signal strengths; (b) comparing each measured signal strength in the plurality of measured signal strengths to a predetermined signal strength; (c) identifying each test location for which the measured signal strength exceeded the predetermined signal strength, so as to obtain a plurality of high-strength locations; (d) determining, for each high-strength location, a respective cellular distance corresponding to a number of cells in the wireless network from the target sector to the high-strength location, so as to obtain a plurality of cellular distances; and (e) determining the range indicator for the target sector based on the plurality of cellular distances.

BRIEF DESCRIPTION OF THE DRAWINGS

FIG. 3 is a table illustrating sector data for a plurality of sectors, in accordance with an example embodiment.

DETAILED DESCRIPTION OF EXAMPLE EMBODIMENTS

1. Introduction

Figure 1:
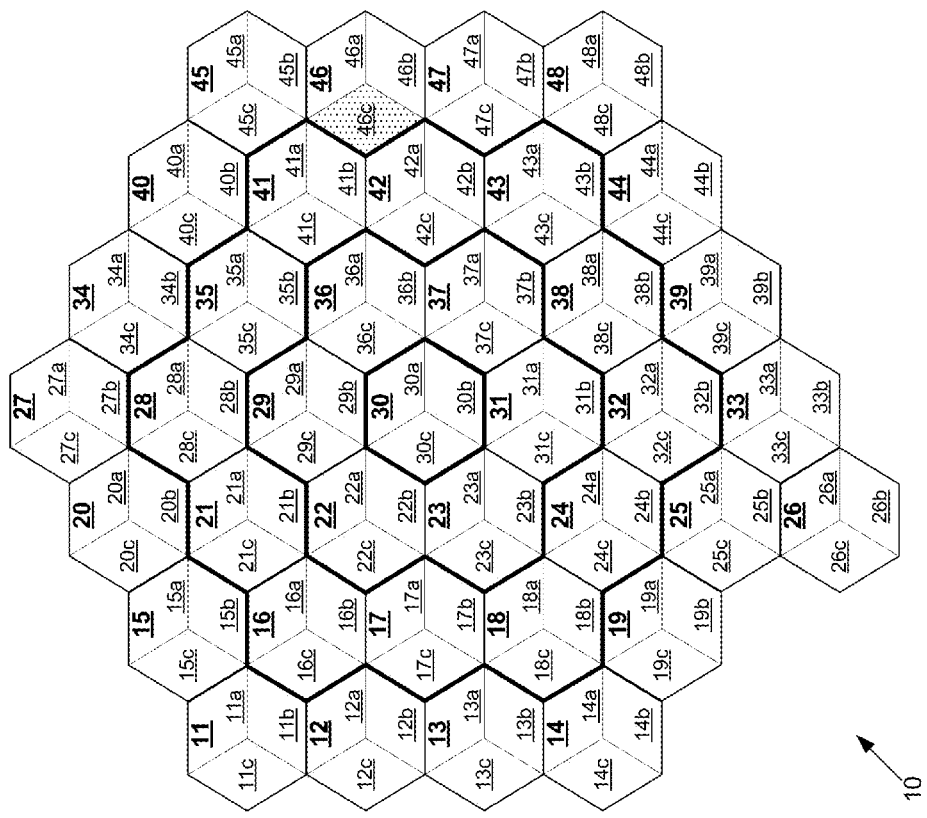
FIG. 1 is a schematic diagram illustrating an arrangement of wireless coverage areas in a wireless network, in accordance with an example embodiment.

The inventors have recognized that the conventional approach of constructing a neighbor list for a mobile station as a composite of the respective lists of predefined neighbors for each wireless coverage area in the mobile station's active set can result in inefficiency. For instance, a wireless coverage area (e.g., a sector) in the mobile station's active set might be relatively distant. This can occur, for example, when the local geography enables a pilot signal from a relatively distant sector to be received at the mobile station's location with a signal strength that is high enough for the relatively distant sector to be added to the mobile station's active set. Such relatively distant sectors with strong pilot signals are often termed "boomers." While it can be beneficial to include a boomer sector in a mobile station's active set, it can be undesirable to include the boomer's neighbors in the mobile station's neighbor list because the boomer's neighbors are not near the mobile station's location. In particular, having the mobile station scan for the boomer's neighbors can be inefficient because they are unlikely to have pilot signals that are strong enough at the mobile station's location to be good candidates for addition to the mobile station's active set.

To address such inefficiencies, a range indicator may be defined for each wireless coverage area (e.g., cell or sector) in the wireless network. The range indicator for a given wireless coverage area, such as a sector, may indicate whether the sector's pilot signal has a standard range or a non-standard range. For example, "boomer" sectors may have non-standard range indicators, whereas other sectors may have standard range indicators. The range indicator for a sector may be stored in association with a list of predefined neighbors for the sector. For example, the range indicator for a sector may be a field in a data record for the sector that takes on a value, such as "0," to indicate a standard range, or a value, such as "1," to indicate a non-standard range. In other examples, the range indicators could take on other values, such as other numerical values, text, symbols, flags, or other types of indicators.

The range indicators for the sectors in a wireless network may be determined based on tests in which a receiver measures signal strengths of pilot signals from various sectors at each of a plurality of different test locations. If the pilot signal from a sector is found to have a relatively high signal strength (e.g., a signal strength that exceeds a predetermined signal strength) at a test location that is relatively distant from that sector, then the range of that sector's pilot signal may be classified as non-standard and a non-standard range indicator may be selected for that sector. On the other hand, if the signal strength of a pilot signal from a sector is found to be relatively high (e.g., above the predetermined signal strength) only in test locations that are relatively proximate to that sector, then the range of that sector's pilot signal may be classified as standard and a standard range indicator may be selected for that sector.

The predefined range indicators (e.g., range indicators that have been defined based on the tests described above) may then be used to determine how to construct neighbor lists for mobile stations. For example, when a sector is added to a mobile station's active set, the predefined range indicator for the sector may affect whether the predefined neighbors for the sector are included in the mobile station's neighbor list. If the predefined range indicator for the sector is a standard range indicator, then the neighbor list for the mobile station may be constructed so as to include the predefined neighbors for the sector. If the predefined range indicator for the sector is a non-standard range indicator, then the neighbor list for the mobile station may be constructed so as not to include the predefined neighbors for the sector. In this way, a sector with a non-standard range, such as a boomer sector, may be included in a mobile station's active set but the predefined neighbors for the sector may be omitted from the mobile station's neighbor list.

It is to be understood, however, that the determination of whether to include a sector's predefined neighbors in a mobile station's neighbor list can take into consideration other factors in addition to the sector's predefined range indicator. For example, the predefined neighbors for a sector having a non-standard range indicator may be included in a mobile station's neighbor list if the sector is the mobile station's primary sector (e.g., the sector with the strongest pilot signal measured by the mobile station).

It is also possible to define different types of range indicators. For example, instead of just two types of range indicators (standard and non-standard), three or more different types of range indicators could be defined. For example, a predefined range indicator for a sector could be one of a short-range indicator, medium-range indicator, or long-range indicator. Other types of range indicators are possible as well.

2. Example Wireless Network

FIG. 1 schematically illustrates an example arrangement of wireless coverage areas in a wireless network 10. In this example, the wireless coverage of wireless network 10 is divided into cells 11-48 and each cell is divided into three sectors. Thus, cell 11 includes sectors 11a, 11b, and 11c, cell 12 includes sectors 12a, 12b, and 12c, etc. For purposes of illustration, FIG. 1 shows each cell as being hexagonal and shows each cell as having the same size. It is to be understood, however, that the wireless coverage provided by a cell may, in practice, extend different amounts in different directions. Moreover, the wireless coverage provided by different cells can overlap, making the definition of boundaries between cells somewhat arbitrary. In addition, different cells can have different sizes due to different transmit power levels, geography, and/or other factors.

The heavy boundary lines in FIG. 1 are intended to illustrate how different tiers of cells can be defined around a given cell. In the example shown in FIG. 1, cell 30 is the given cell. The cells immediately surrounding cell 30, i.e., cells 28, 36, 37, 31, 23, and 22, may constitute "Tier 1" with respect to cell 30. The cells immediately surrounding Tier 1, i.e., cells 27, 35, 41, 42, 43, 38, 32, 24, 18, 17, 16, and 21, may constitute "Tier 2" with respect to cell 30. For a mobile station located in cell 30, this definition of Tier 1 and Tier 2 cells around cell 30 can be useful in predicting which standard-range sectors outside of cell 30 are likely to have pilot signals that are received by the mobile station at signal strengths high enough to be added to the mobile station's active set. For example, signals from sectors in Tier 1 may have a relatively high probability, signals from sectors in Tier 2 may have a medium probability, and signals from sectors outside of Tier 2 may have a relatively low probability of being received in cell 30 with a signal strength that is high enough to be added to a mobile station's active set.

With this definition of Tier 1 and Tier 2, when a mobile station receives a pilot signal from a sector that is outside of Tier 2 with a signal strength that is high enough to be added to the mobile station's active set, that sector may be identified as having a non-standard range, such as a "boomer" sector. For example, sector 46c could be a "boomer" sector (indicated by the shading in FIG. 1). As a result, a mobile station located in sector 30a of cell 30 may receive a pilot signal from sector 46c with a signal strength that is high enough to be added to the mobile station's added set, even though sector 46c is outside of Tier 2 (i.e., more than 2 cells away from cell 30).

It is to be understood, however, that non-standard ranges could be defined in other ways. For example, a non-standard range could be defined based on Tier 3 instead of Tier 2. More generally, a non-standard range could be based on the number of cells from the transmitting sector from which the pilot signal is transmitted to the receiving sector in which the pilot signal is received at a relatively high signal strength. If the number of cells is more than a predetermined number (e.g., more than 2 cells for a Tier 2 definition, more than 3 cells for a Tier 3 definition, etc.), then the transmitting sector may be identified as having a non-standard range. Thus, non-standard ranges could be defined based on cellular distances in the wireless network. Alternatively, non-standard ranges could be defined based on actual distances. Other ways of defining non-standard ranges are possible as well.

Figure 2:
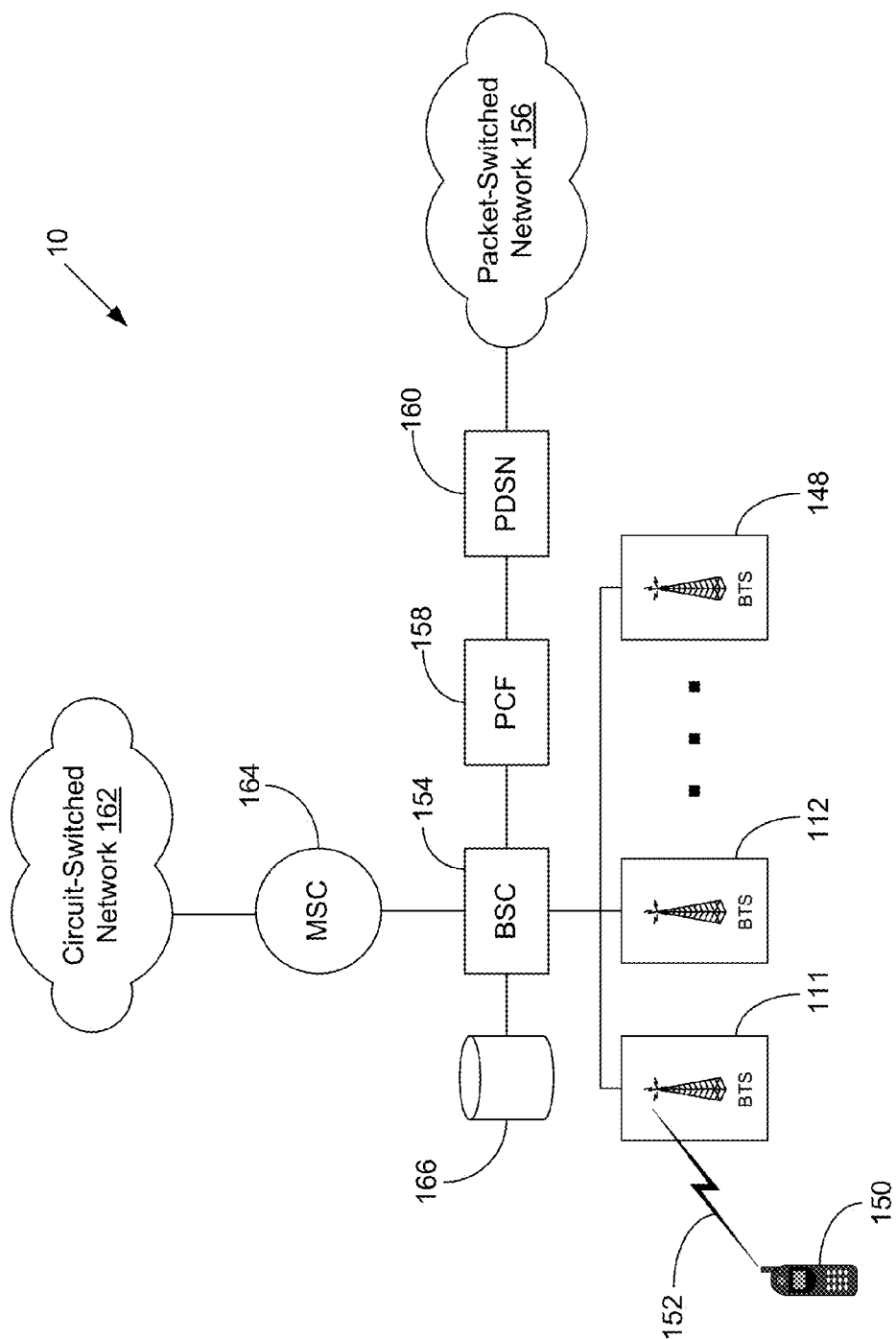
FIG. 2 is a functional block diagram illustrating a network architecture of a wireless network, in accordance with an example embodiment.

FIG. 2 illustrates an example network architecture for wireless network 10. In this example, cells 1-48 shown in FIG. 1 are defined by base transceiver stations (BTSs) 111-148, respectively. Each BTS may include multiple transceivers and directional antennas to define multiple sectors. In the example shown in FIG. 1, each cell includes three sectors. Alternatively, a cell may include a greater or fewer number of sectors.

Each BTS may communicate with one or more mobile stations via an air interface. For example, FIG. 2 shows a mobile station 150 in communication with BTS 111 via an air interface 152. Mobile station 150 could be for example, a wireless telephone, a wirelessly-equipped computer, or other type of wireless communication device. Air interface 152 may include a forward link through which BTS 111 transmits signals to mobile station 150 and a reverse link through which BTS 111 receives signals transmitted by mobile station 150. The forward link and reverse link signals could conform to a protocol, such as 1xRTT CDMA, EVDO, WiMAX, LTE, or other wireless protocol. The transmissions over air interface 150 may carry voice, video, data, text, or other media.

BTSs 111-148 may be controlled by one or more base station controllers (BSCs), as exemplified in FIG. 2 by BSC 154. BSC 154 may also provide access to one or more transport networks, which may include packet-switched networks (e.g., the Internet) and/or circuit-switched networks (e.g., the public switched telephone network). As shown, BSC 154 is communicatively coupled to a packet-switched network 156 via a packet control function (PCF) 158 and a packet data serving node (PDSN) 160, and BSC 154 is also communicatively coupled to a circuit-switched network 162 via a mobile switching center (MSC) 164. In this way, mobile stations, such as mobile station 150, may communicate with endpoints via packet-switched network 156 and/or circuit-switched 162. Such endpoints may include, for example, mobile stations, landline stations, voice-over-Internet-protocol (VoIP) devices, Web servers, email servers, media servers, gaming servers, and/or other devices.

BSC 154 may have access to data storage 166 that stores sector data for a plurality of sectors in wireless network 10. FIG. 3 is a table illustrating example sector data that may be stored in data storage 166. More particularly, FIG. 3 shows sector data for sectors 30a, 30b, 30c, 37c, and 46c, as representative of the sector data that may be stored for each of the sectors in wireless network 10. The sector data for each of these sectors includes a predefined range indicator and a list of predefined neighbors. In this example, the predefined range indicator is a flag called "K_BOOM" that can be either "0" or "1." K_BOOM=0 indicates a standard range, whereas K_BOOM=1 indicates a non-standard range (e.g., a "boomer" sector). Thus, the sector data shown in FIG. 3 indicates that sectors 30a, 30b, 30c, 37c, have a standard range and that sector 46c has a non-standard range.

As described in more detail below, BSC 154 may access sector data stored in data storage 166 in order to construct neighbor lists for mobile stations. For example, if a mobile station's active set includes sector 30a and sector 46c, BSC 154 may retrieve the sector data for those sectors from data storage 166 to construct a neighbor list for the mobile station. BSC 154 may then refer to the predefined range indicator for each sector to determine whether to include that sector's predefined neighbors in the mobile station's neighbor list. For example, based on the predefined range indicator for sector 30a being the standard range indicator (K_BOOM=0), BSC 154 may populate the neighbor list for the mobile station with the predefined neighbors for sector 30a (i.e., sectors 30b, 30c, 22a, 29b, 29c, 36b, 36c, and 37a). However, based on the predefined range indicator for sector 46c being the non-standard range (K_BOOM=1), BSC 154 may omit the predefined neighbors for sector 46c from the neighbor list for the mobile station.

In some examples, when constructing a neighbor list for a mobile station, BSC 154 may also consider whether a sector in the mobile station's active set is the mobile station's primary sector or a non-primary sector. The primary sector could be defined as the sector that the mobile station monitors for page messages or other overhead messages, the sector with the strongest pilot signal strength measured by the mobile station, or defined in some way. Thus, to construct a neighbor list based on a mobile station's active set, BSC 154 may identify the primary sector in the active set and may consider any other sectors in the active set to be non-primary sectors. BSC 154 may then include the predefined neighbors for the mobile station's primary sector in the mobile station's neighbor list, regardless of whether the primary sector has a standard range indicator or a non-standard range indicator. For a non-primary sector, BSC 154 may include the predefined neighbors for the non-primary sector in the neighbor list if the non-primary sector has a standard range indicator but may omit the predefined neighbors for the non-primary sector from the neighbor list if the non-primary sector has a non-standard range indicator.

Although FIG. 2 shows data storage 166 as being a separate network element from BSC 154, it is to be understood that data storage 166 could be entirely or partially integrated within BSC 154. In addition, the sector data for wireless network 10 could be stored in one data storage element (e.g., data storage 166), or the sector data could be distributed among multiple data storage elements.

It should also be understood that other network elements in addition to or instead of BSC 154 may access sector data from data storage 166 and/or other data storage elements to construct neighbor lists for mobile stations. Such other network elements could include, for example, other BSCs, MSCs (e.g., MSC 164), radio network controllers (RNCs), application servers, and/or other elements.

3. Example Methods

Figure 4:
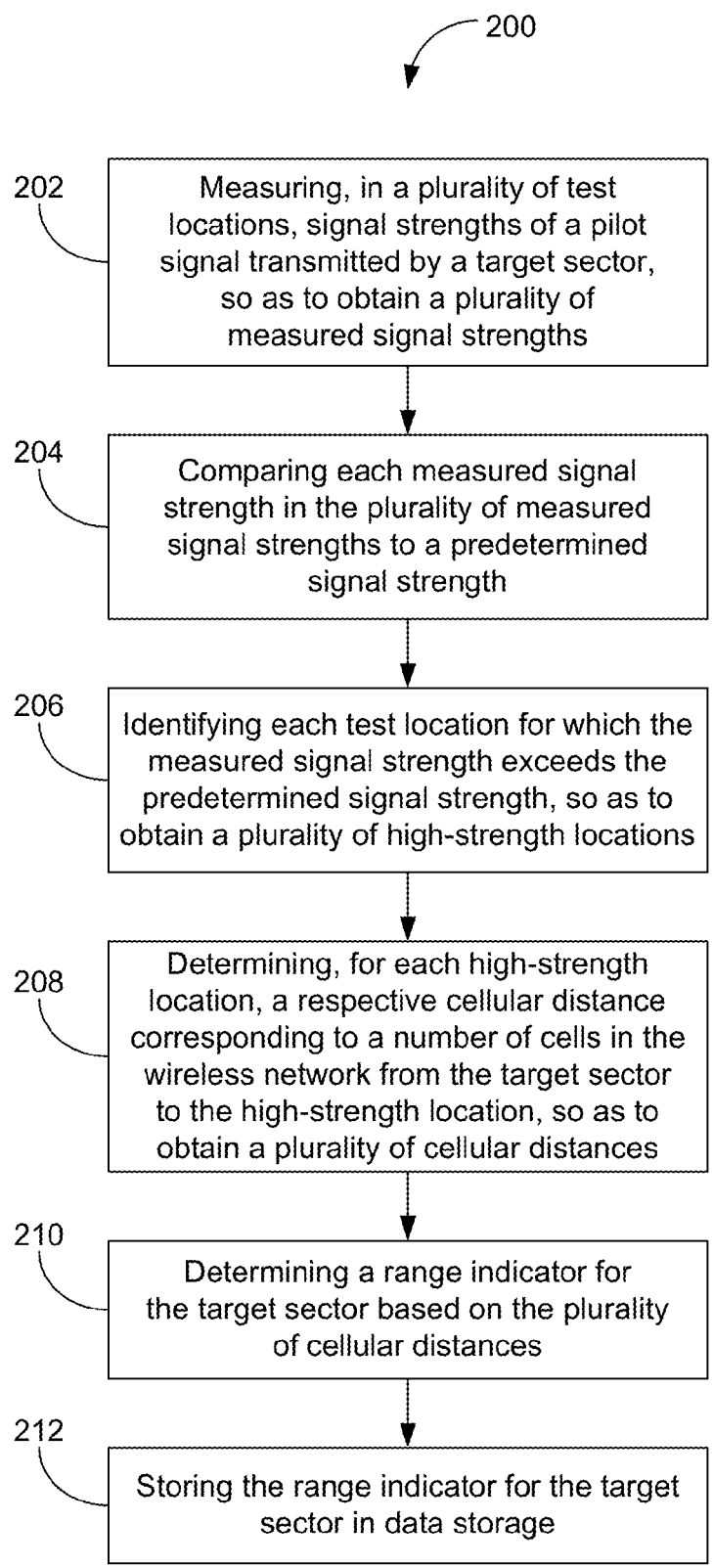
FIG. 4 is a flow chart illustrating a method in which a range indicator is determined for a sector, in accordance with an example embodiment.
Figure 5:
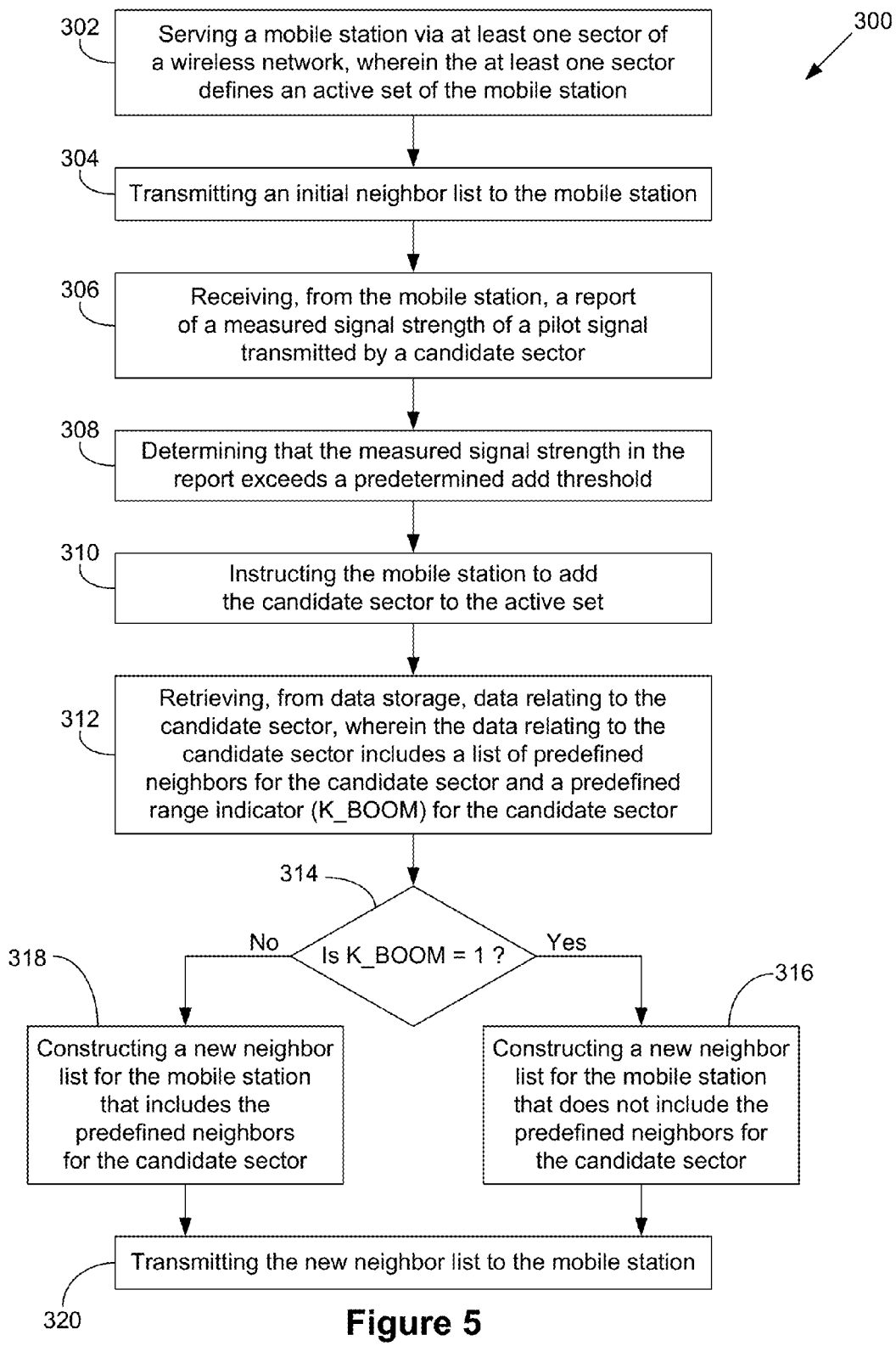
FIG. 5 is a flow chart illustrating a method in which a neighbor list is constructed for a mobile station, in accordance with an example embodiment.

FIG. 4 is a flow chart illustrating an example method 200 in which a range indicator is determined for a target sector of a wireless network. FIG. 5 is a flow chart illustrating an example method 300 in which a neighbor list is constructed for a mobile station. These examples methods are described below with regard to the example wireless network 10 shown in FIGS. 1 and 2 and the example sector data shown in FIG. 3. It is to be understood that other configurations could also be used.

With reference to FIG. 4, method 200 may involve measuring, in a plurality of test locations, signal strengths of a pilot signal transmitted by a target sector, so as to obtain a plurality of measured signal strengths, as indicated by block 202. The target sector could be any sector in wireless network 10. The plurality of test locations could be any locations within the wireless coverage provided by wireless network 10. In an example approach, the plurality of test locations may include a representative number of locations that cover, in a statistically significant way, the areas in which the pilot signal transmitted by the target sector can be received. The measurements may be taken in one or more drive tests in which a receiver is transported to different test locations. At each test location, the receiver may measure the signal strength of the target sector's pilot signal, and the measured signal strength may be recorded along with an identification of the test location and the time and date of measurement. For a CDMA pilot signal, the measured signal strength could be, for example, a received signal strength indicator (RSSI) value, a received energy per chip ($E_C$) value, a received energy per chip over interference ($E_C/I_0$) value, or other type of signal strength characterization.

Method 200 may also involve comparing each measured signal strength in the plurality of measured signal strengths to a predetermined signal strength, as indicated by block 204. The predetermined signal strength could, for example, correspond to a predetermined add threshold that is used to determine whether to add a sector to a mobile station's active set. Thus, the comparison of block 204 could identify any measured signal strengths that would be sufficient to add the target sector to a mobile station's active set.

Method 200 may further involve identifying each test location for which the measured signal strength exceeds the predetermined signal strength, so as to obtain a plurality of high-strength locations, as indicated by block 206. If the target sector that has a standard range, the high-strength locations are likely to be locations that are relatively proximate to the test sector. However, if the test sector has a non-standard range, then the high-strength locations could include locations are that are relatively distant from the target sector.

Thus, method 200 may further involve determining, for each high-strength location, a respective cellular distance corresponding to a number of cells in the wireless network from the target sector to the high-strength location, so as to obtain a plurality of cellular distances, as indicated by block 208. For example, if the target sector is sector 46c shown in FIG. 1, any high-strength locations in cells 41 and 42 would have a cellular distance of 1, any high-strength locations in cells 35, 36, and 37 would have a cellular distance of 2, any high-strength locations in cells 28, 29, 30, and 31 would have a cellular distance of 3, and so forth.

Method 200 may then involve determining a range indicator for the target sector based on the plurality of cellular distances, as indicated by block 210. In an example, the determination of the range indicator for the target sector could involve a selection of either a standard range indicator or a non-standard range indicator. The selection could, for example, be based on a comparison of the cellular distances to a predetermined number of cells. If any of the cellular distances in the plurality of cellular distances corresponds to more than the predetermined number of cells, then the non-standard range indicator may be selected as the range indicator for the target sector. If none of the cellular distances in the plurality of cellular distances corresponds to more than the predetermined number of cells, then the standard range indicator may be selected as the range indicator for the target sector.

For instance, the predetermined number of cells could be 2 and the target sector could be sector 46c. If any of the high-strength locations are in cells 28, 29, 30 or 31, the non-standard range indicator may be selected, as these cells all have a cellular distance of 3 from sector 46c. On the other hand, if all of the high-strength locations are in cells with cellular distances of 2 or less from sector 46c, the standard range indicator may be selected.

Some implementations may also consider the number or frequency of high-strength locations with cellular distances that are more than the predetermined number of cells. For example, if only one high-strength location out of many is found to be more than the predetermined number of cells from the target sector, that single instance might be considered an "outlier" and not used as a basis to select a non-standard range indicator for the target sector. Thus, a non-standard range indicator might be selected for a target sector only if a sufficient number (e.g., a statistically number) of high-strength locations are found to be more than the predetermined number of cells from the target sector. As well, a standard range indicator might be selected for a target sector if only a relatively few (e.g., a statistically insignificant number) of the high-strength locations are found to be more than predetermined number of cells from the target sector. Other criteria for determining the range indicator for the target sector could also be used.

Once the range indicator has been determined for the target sector, method 200 may involve storing the range indicator for the target sector in data storage (e.g., data storage 166), as indicated by block 212. The range indicator for the target sector may be stored in sector data that also includes a list of predefined neighbors for the target sector, for example, as shown in FIG. 3. Thus, the range indicator for the target sector may be associated with the predefined neighbors for the target sector in the data storage.

Although method 200 has been described in terms of determining a range indicator for a single target sector, it is to be understood that the method could also be used to determine range indicators for multiple target sectors in the wireless network. Thus, the measuring of block 202 could result in measured signal strengths for multiple target sectors, and the data analysis of blocks 206-210 could be used to determine a respective range indicator each of the multiple target sectors. Finally, the range indicators for the multiple target sectors could all be stored in the data storage, as in block 212.

Once range indicators have been determined for some or all of the sectors in the wireless network, and stored in data storage in association with predefined neighbors for each sector, the range indicators may be used as predefined range indicators for constructing neighbor lists for mobile stations. FIG. 5 illustrates an example method 300 in which a predefined range indicator is used to determine how to construct a neighbor list for a mobile station.

Method 300 may involve serving a mobile station via at least one sector of a wireless network, wherein the at least one sector defines an active set of the mobile station, as indicated by block 302. As one specific example, a mobile station may be located in cell 30 and have two sectors, sector 30a and sector 30b, in its active set.

The wireless network may also transmit an initial neighbor list to the mobile station, as indicated by block 304. The initial neighbor list may be constructed (e.g., by BSC 154) based on sector data (e.g., as shown in FIG. 3) that includes a predefined range indicator and a list of predefined neighbors for each sector in the mobile station's active set. Thus, in the specific example in which the mobile station has sector 30a and sector 30b in its active set, BSC 154 may retrieve the sector data for these sectors from data storage 166. In the sector data for sectors 30a and 30b shown in FIG. 3, both sectors have standard range indicators (K_BOOM=0), so the neighbor list for the mobile station may be constructed by merging the list of predefined neighbors for sectors 30a and 30b, but omitting any sectors that are already in the mobile station's active set (i.e., sectors 30a and 30b). In this example, sectors 30a and 30b both have eight predefined neighbors, though it is to be understood that a sector could have a greater or fewer number of predefined neighbors and different sectors could have different numbers of predefined neighbors. In addition, there is some overlap between the predefined neighbors in this example, in that the predefined neighbors for both of sectors 30a and 30b include sectors 30c, 36b, and 37a. Thus, the initial neighbor list that is constructed would include sectors 22a, 29b, 29c, and 36c (from the list of predefined neighbors for sector 30a), sectors 23b, 31a, 31c, and 37c (from lists of predefined neighbors for sector 30b), and sectors 30c, 36b, and 37a (which are included in both lists of predefined neighbors).

After receiving the initial neighbor list, the mobile station may scan for pilot signals from the sectors identified in the initial neighbor list. For example, in the case of CDMA, the initial neighbor list may identify each sector by a respective pseudonoise (PN) offset used by the pilot signal transmitted by the sector. Alternative or additionally, the initial neighbor list may identify sectors in other ways, such as by frequency or time slot.

As noted above, the mobile station may scan for pilot signals from the sectors identified in the initial neighbor list. However, the mobile station may also scan for other pilot signals. When the mobile station detects a pilot signal from the scanning, either a pilot signal from a sector identified in the initial neighbor list or a pilot signal from some other sector, the mobile station may measure the signal strength of the pilot signal and report the measured signal strength to the wireless network, for example, by transmitting a Pilot Strength Measurement Message (PSMM).

At some point, the mobile station may measure a pilot signal from a sector with a signal strength that is high enough to make that sector a candidate for addition to the mobile station's active set. Thus, the wireless network may receive, from the mobile station, a report of a measured signal strength of a pilot signal transmitted by a candidate sector, as indicated by block 306. The candidate sector could be a sector identified in the initial neighbor list, or some other sector in the wireless network.

After receiving the report, the wireless network may determine that the measured signal strength in the report exceeds a predetermined add threshold, as indicated by block 308. In response to this determination, the wireless network may instruct the mobile station to add the candidate sector to the active set, as indicated by block 310. For example, the wireless network could transmit a Handoff Direction Message (HDM) to the mobile station.

The wireless network may also construct a new neighbor list for the mobile station based on the addition of the candidate sector to the mobile station's active set. This may involve retrieving (e.g., by BSC 154), from data storage (e.g., data storage 166), data relating to the candidate sector, wherein the data relating to the candidate sector includes a list of predefined neighbors for the candidate sector and a predefined range indicator for the candidate sector, as indicated by block 312. The data relating to the candidate sector could be in the form shown in FIG. 3, in which the predefined range indicator corresponds to the K_BOOM field.

How the new neighbor list is constructed may depend on whether the predefined range indicator for the candidate sector indicates a non-standard range (e.g., whether K_BOOM=1), as indicated by block 314. If K_BOOM=1 for the candidate sector, then the new neighbor list that is constructed for the mobile station would not include the predefined neighbors for the candidate sector, as indicated by block 316. As a result, the new neighbor list would be the same as the initial neighbor list. To give a specific example, suppose that the candidate sector is sector 46c. The sector data for sector 46c in FIG. 3 has K_BOOM=1. Based on the predefined range indicator for sector 46c being the non-standard range indicator, the predefined neighbors for sector 46c would not be included in the new neighbor list (except to the extent that any of the predefined neighbors for sector 46c are already in the initial neighbor list).

On the other hand, if K_BOOM=0 for the candidate sector, then the new neighbor list that is constructed for the mobile station would include the predefined neighbors for the candidate sector, as indicated by block 318. As a result, the new neighbor list would be different than the initial neighbor list. To give a specific example, suppose that the candidate sector is sector 37c. The sector data for sector 37c in FIG. 3 has K_BOOM=0. Based on the predefined range indicator for sector 37c being the standard range indicator, the predefined neighbors for sector 37c would be added to the sectors in the initial neighbor list (except to the extent that any of the predefined neighbors for sector 37c are already in the initial neighbor list or are in the mobile station's active set) to form the new neighbor list.

Once the new neighbor list has been constructed, the wireless network may transmit the new neighbor list to the mobile station, as indicated by block 320. The mobile station may then scan for pilot signals from the sectors identified in the new neighbor list.

In accordance with the example methods described above for FIGS. 4 and 5, sectors that have non-standard ranges (e.g., "boomer" sectors) may be identified and flagged prior to a mobile station reporting a signal strength measurement from such a sector. Then, when a mobile station reports a sufficiently high signal strength from a sector having a non-standard range, the sector may be added to the mobile station's active set but the predefined neighbors may not be added based on the predefined range indicator for the sector indicating the non-standard range.

4. Conclusion

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method, comprising:
receiving, from a mobile station, a report of a measured signal strength of a pilot signal transmitted by a candidate sector, wherein the mobile station has an active set of at least one sector;
instructing the mobile station to add the candidate sector to the active set;
retrieving, from data storage, data relating to the candidate sector, wherein the data relating to the candidate sector includes a list of predefined neighbors for the candidate sector and a predefined range indicator for the candidate sector;
constructing a neighbor list for the mobile station, wherein constructing the neighbor list for the mobile station comprises determining whether to include in the neighbor list the predefined neighbors for the candidate sector based on the predefined range indicator for the candidate sector, wherein determining whether to include in the neighbor list the predefined neighbors for the candidate sector based on the predefined range indicator for the candidate sector comprises: if the predefined range indicator is a standard range indicator, including the predefined neighbors for the candidate sector in the neighbor list; and if the predefined range indicator is a non-standard range indicator, omitting the predefined neighbors for the candidate sector from the neighbor list; and transmitting the neighbor list to the mobile station.

2. The method of claim 1, further comprising:

prior to receiving the report from the mobile station, (i) classifying a range of the pilot signal transmitted by the candidate sector as one of a standard range and a non-standard range, (ii) determining the predefined range indicator based on the classified range, and (iii) storing the predefined range indicator in the data storage.

3. The method of claim 2, wherein classifying the range of the pilot signal transmitted by the candidate sector as one of the standard range and the non-standard range comprises:

conducting tests in which signal strengths of the pilot signal transmitted by the candidate sector are measured in a plurality of locations; and classifying the range of the pilot signal transmitted by the candidate sector as one of the standard range and the non-standard range based on the tests.

4. The method of claim 3, wherein classifying the range of the pilot signal transmitted by the candidate sector as one of the standard range and the non-standard range based on the tests comprises:

if the tests result in a measurement in which the signal strength of the pilot signal exceeds a predetermined signal strength at a location that is more than a predetermined number of wireless coverage areas away from the candidate sector, classifying the range of the pilot signal as the non-standard range; and if the tests do not result in a measurement in which the signal strength of the pilot signal exceeds the predetermined signal strength at a location that is more than the predetermined number of wireless coverage areas away from the candidate sector, classifying the range of the pilot signal as the standard range.

5. The method of claim 1, wherein constructing a neighbor list for the mobile station comprises:

for each sector in the at least one sector, retrieving, from the data storage, a respective list of predefined neighbors for the sector and including the predefined neighbors for the sector in the neighbor list.

6. The method of claim 1, further comprising:

determining that the measured signal strength in the report exceeds a predetermined add threshold.

7. The method of claim 6, wherein instructing the mobile station to add the candidate sector to the active set and retrieving, from data storage, data relating to the candidate sector, occur in response to determining that the measured signal strength in the report exceeds the threshold signal strength.

8. The method of claim 1, wherein the data storage is accessible by a base station controller (BSC), and wherein retrieving, from data storage, data relating to the candidate sector comprises the BSC retrieving the data relating to the candidate sector from the data storage.

9. The method of claim 8, wherein constructing the neighbor list for the mobile station comprises the BSC constructing the neighbor list for the mobile station, and wherein transmitting the neighbor list to the mobile station comprises transmitting the neighbor list via a base transceiver station (BTS).

10. The method of claim 9, wherein the BTS receives the report from the mobile station.

11. A system, comprising:

data storage, wherein the data storage stores sector data for a plurality of sectors in a wireless network, the sector data including for each given sector in the plurality of sectors a respective list of predefined neighbors for the given sector and a predefined range indicator for the given sector, wherein each predefined range indicator in the sector data is one of a standard range indicator or a non-standard range indicator; and a controller for controlling wireless service provided to a mobile station having an active set of sectors, wherein the controller is configured to retrieve from the data storage the sector data for each sector in the mobile station's active set and construct a neighbor list for the mobile station based on the predefined neighbors and predefined range indicators in the retrieved sector data.

12. The system of claim 11, wherein the active set of sectors includes a primary sector and at least one non-primary sector, and wherein the controller is configured to construct the neighbor list for the mobile station by a process comprising:

including the predefined neighbors for the primary sector in the neighbor list for the mobile station; and for each non-primary sector, (i) including the predefined neighbors for the non-primary sector in the neighbor list for the mobile station if the predefined range indicator for the non-primary sector is the standard range indicator but (ii) omitting the predefined neighbors for the non-primary sector from the neighbor list for the mobile station if the predefined range indicator for the non-primary sector is the non-standard range indicator.

13. The system of claim 11, wherein the controller comprises a base station controller (BSC).

14. A method for a wireless network that provides wireless coverage in a plurality of cells, wherein each cell in the plurality of cells includes a respective plurality of sectors, the method comprising:

obtaining a range indicator for a target sector in the wireless network, wherein obtaining the range indicator for the target sector comprises:

measuring, in a plurality of test locations, signal strengths of a pilot signal transmitted by the target sector, so as to obtain a plurality of measured signal strengths;

comparing each measured signal strength in the plurality of measured signal strengths to a predetermined signal strength;

identifying each test location for which the measured signal strength exceeds the predetermined signal strength, so as to obtain a plurality of high-strength locations;

determining, for each high-strength location, a respective cellular distance corresponding to a number of cells in the wireless network from the target sector to the high-strength location, so as to obtain a plurality of cellular distances; and determining the range indicator for the target sector based on the plurality of cellular distances; and storing the range indicator for the target sector in data storage, wherein the data storage is accessible by a controller configured to construct neighbor lists for mobile stations being served by the wireless network.

15. The method of claim 14, wherein storing the range indicator for the target sector in data storage comprises storing in the data storage an association between the range indicator for the target sector and a list of predefined neighbors for the target sector.

16. The method of claim 14, wherein determining the range indicator for the target sector based on the plurality of cellular distances comprises selecting one of a standard range indictor and a non-standard range indicator as the range indicator for the target sector based on the plurality of cellular distances.

17. The method of claim 16, wherein selecting one of the standard range indictor and the non-standard range indicator for the target sector based on the plurality of cellular distances comprises:
- if any of the cellular distances in the plurality of cellular distances corresponds to more than a predetermined number of cells, selecting the non-standard range indicator as the range indicator for the target sector; and
- if none of the cellular distances in the plurality of cellular distances corresponds to more than the predetermined number of cells, selecting the standard range indicator as the range indicator for the target sector.

18. The method of claim 14, further comprising:
- obtaining range indicators for multiple target sectors in the wireless network; and
- storing the range indicators for the multiple target sectors in the data storage.

* * * * *